(12) United States Patent
Nishimura

(10) Patent No.: US 8,247,059 B2
(45) Date of Patent: Aug. 21, 2012

(54) TWO-COLOR MOLDED PRODUCT

(75) Inventor: Takeshi Nishimura, Kyoto (JP)

(73) Assignee: Nissha Printing Co., Ltd., Kyoto (JP)

( * ) Notice: Subject to any disclaimer, the term of this patent is extended or adjusted under 35 U.S.C. 154(b) by 0 days.

(21) Appl. No.: 13/346,962

(22) Filed: Jan. 10, 2012

(65) Prior Publication Data

US 2012/0141722 A1  Jun. 7, 2012

Related U.S. Application Data

(62) Division of application No. 13/124,906, filed as application No. PCT/JP2009/069840 on Nov. 25, 2009, now Pat. No. 8,113,808.

(30) Foreign Application Priority Data

Nov. 28, 2008 (JP) ................................. 2008-304944

(51) Int. Cl.
*B32B 3/14* (2006.01)
*B29C 45/14* (2006.01)
*B29C 45/16* (2006.01)

(52) U.S. Cl. ............ 428/77; 425/89; 425/542; 425/547; 425/566; 425/577; 428/55; 428/58

(58) Field of Classification Search .................... 428/77, 428/55, 58; 425/89, 542, 547, 566, 577
See application file for complete search history.

(56) References Cited

U.S. PATENT DOCUMENTS

| 7,290,639 | B2 | 11/2007 | Sato et al. |
| 2005/0257998 | A1 | 11/2005 | Sato et al. |
| 2009/0250845 | A1 | 10/2009 | Suzuki |

FOREIGN PATENT DOCUMENTS

| JP | 2005-333277 | 12/2005 |
| JP | 2007-118214 | 5/2007 |
| JP | 2008-137240 | 6/2008 |
| WO | 2008/123191 | 10/2008 |

OTHER PUBLICATIONS

International Search Report issued Feb. 2, 2010 in corresponding International Application No. PCT/JP2009/069840.

*Primary Examiner* — Brent Ohern
(74) *Attorney, Agent, or Firm* — Wenderoth, Lind & Ponack, L.L.P.

(57) ABSTRACT

A two-color molding equipment for shaping a two-color molded product by placing a film in primary mold tool configured by a fixed mold and a movable mold, injecting a resin into a first cavity to shape a primary molded piece, shifting the primary molded piece provided with the film to secondary mold tool configured by the fixed mold and the movable mold, and injecting a resin into a second cavity to shape a secondary molded piece, wherein the first cavity is configured to shape the primary molded piece to be smaller than the film so that a part of the film protrudes from the primary molded piece, and a wall surface located at the protruding portion of the film to constitute the first cavity is provided with a convex portion that restricts mold shrinkage of the film protruding portion in the primary molded piece.

2 Claims, 6 Drawing Sheets

(a)

(b)

(a)

(b)

TWO-COLOR MOLDED PRODUCT

This application is a divisional of application Ser. No. 13/124,906, filed on Apr. 19, 2011, now U.S. Pat. No. 8,113,808, which is the National Stage of International Application No. PCT/JP2009/069840, filed Nov. 25, 2009.

TECHNICAL FIELD

The present invention relates to a two-color molding equipment for shaping molded pieces in two steps of primary molding and secondary molding and integrating the pieces into a molded product. The present invention also relates to a two-color molded product.

BACKGROUND ART

In two-color molding, a primary molded piece is shaped with use of a primary mold tool and is ejected therefrom, the primary molded piece is then set directly into a secondary mold tool to conduct secondary molding, and the primary molded piece and a secondary molded piece are integrated into a two-color molded product.

In a case where a film or the like is set in the mold tool upon primary molding, a molded piece can be provided with a film at the same time as molding, which is called as in-mold shaping.

If the film has a design printed thereon, the molded piece is provided with the design on a surface thereof at the time of molding. If there is used a functional film provided with an electric circuit or the like, it is possible to provide the electric circuit on the molded product at the same time as molding.

FIG. 5(a) shows a conventional two-color molded product that is composed of an integrated combination of a primary molded piece 50, a secondary molded piece 51, and a functional film 52 embedded between the molded pieces.

As shown in FIG. 5(b), which is a sectional view taken along lines A-A indicated in FIG. 5(a), such use of the functional film 52 requires an attachment region 53 to be formed for signal pickup.

In the conventional attachment region 53, the secondary molded piece 51 is shaped to be smaller than the primary molded piece 50 so as to expose, to an upper side, a part (film end 52a) of the functional film 52 in an area corresponding to the attachment region 53.

Accordingly, a cable such as a FPC (Flexible Printed Circuits) is always drawn from the upper side of the secondary molded piece 51. Symbol 52b in the figure denotes a terminal for connection with the FPC.

However, the secondary molded piece 51 for two-color molding is often used as an exterior component of a product. In such a case, the cable is desirably drawn from a lower side of the secondary molded piece 51.

In this regard, in a case where the primary molded piece 50 is shaped to be smaller than the secondary molded piece 51 in a manner contrary to the case of FIG. 5(a), the cable can be drawn from the lower side of the secondary molded piece 51.

SUMMARY OF THE INVENTION

Problems to be Solved by the Invention

However, in a case such as shown in FIG. 6 where the primary molded piece 50 is shaped to be smaller than the secondary molded piece 51 in order to draw the cable from the lower side of the secondary molded piece 51, the film end 52a in the attachment region protrudes in a shape of a belt from an edge 50a of the primary molded piece 50. While mold shrinkage occurs to the primary molded piece 50, the film end 52a, which is not in contact with a molten resin, does not shrink. Accordingly, there is generated ruffling (wrinkling) w at the film end 52a due to the shrinkage occurring to the primary molded piece 50 in directions indicated by arrows B.

Generation of the ruffling W causes deterioration of adhesiveness between the primary molded piece 50 and the functional film 52 as well as deterioration of electrical reliability with the FPC connected to the functional film 52. Furthermore, in a case where the secondary molded piece is overlaid and shaped on the functional film 52 having the ruffling W, a surface of the secondary molded piece 51 is also affected by the ruffling W to result in deterioration of the appearance of the product.

The present invention has been made in view of the problems arising upon in-molding a film in two-color molding, and provides a two-color molding equipment that is capable of in-molding a film in a two-color molded product without causing ruffling to the film. The present invention also provides a two-color molded product.

Disclosure of the Invention

The present invention provides a two-color molding equipment for shaping a two-color molded product by placing a film in primary mold tool configured by a fixed mold and a movable mold, injecting a resin into a first cavity formed by closing the molds to shape a primary molded piece, shifting the primary molded piece provided with the film to secondary mold tool configured by the fixed mold and the movable mold, and injecting a resin into a second cavity formed by closing the molds to shape a secondary molded piece, the two-color molded product composed of an integrated combination of the primary molded piece, the secondary molded piece, and the film interposed therebetween, wherein the first cavity is configured to shape the primary molded piece to be smaller than the film so that a part of the film protrudes from the primary molded piece, and a wall surface located at the protruding portion of the film to constitute the first cavity is provided with a convex portion that restricts mold shrinkage of the film protruding portion in the primary molded piece.

In the present invention, it is preferred that the first cavity has a rectangular shape when seen from a direction of closing the molds, the convex portion is provided at respective ends with concave portions, and the concave portions are located at both ends of the first cavity forming wall surface.

In the present invention, it is preferred that the second cavity is sized so as to shape the secondary molded piece that covers substantially an entire surface of the film.

In the present invention, the film can be composed of a functional film that is provided with an electric circuit or the like.

It is preferred that the electric circuit is provided on a surface opposite to a surface on which the secondary molded piece is overlaid.

The present invention provides a two-color molded product comprising:
a primary molded piece shaped by primary molding;
a secondary molded piece overlaid on the primary molded piece and shaped by secondary molding; and
a functional film interposed between the molded pieces and provided on a surface thereof with an electric circuit or the like, wherein
the secondary molded piece is formed to be substantially equal in size with the film, the primary molded piece is formed to be smaller than the secondary molded piece so as to allow a part of the functional film to protrude therefrom, and a protruding portion of the functional film has an exposed surface that configures a signal pickup portion for picking up a signal from the functional film.

In the two-color molded product of the present invention, the secondary molded piece configures an outer surface of a hausing component.

Effects of the Invention

The present invention exerts an advantage that a film can be in-molded in a two-color molded product without causing ruffling to the film.

Moreover, in a case where a functional film having an electric circuit formed thereon is in-molded in a two-color molded product, a secondary molded piece can serve as a housing and can be provided with a signal pickup portion on an inner side thereof.

MODE FOR CARRYING OUT THE INVENTION

Figure 1:
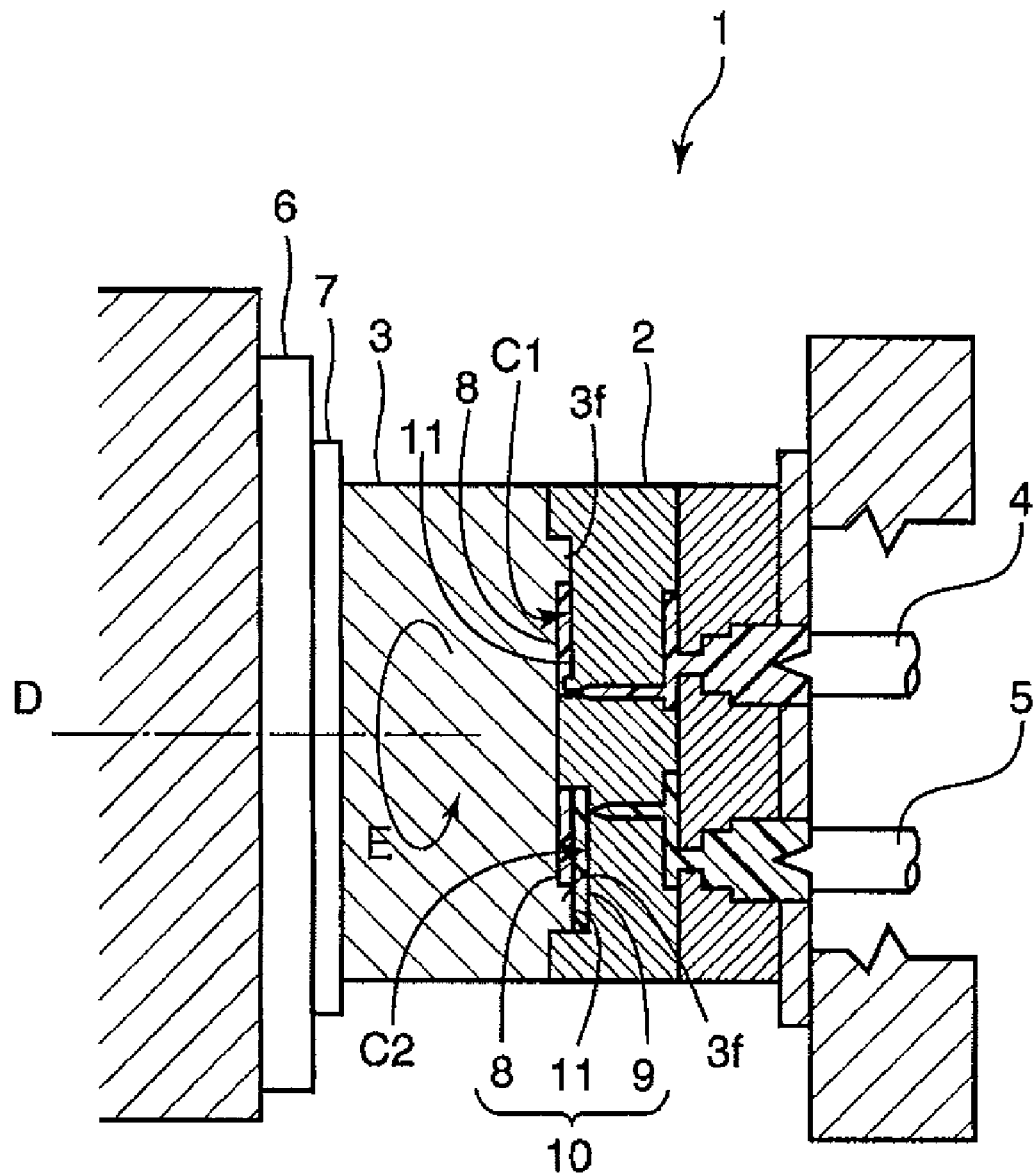
FIG. 1 is a front longitudinal sectional view of a two-color molding equipment according to the present invention.

Described in detail below is an embodiment of the present invention with reference to the drawings.
1. Two-Color Molding Equipment FIG. 1 is a front longitudinal sectional view showing a configuration of a two-color molding equipment according to the present invention.

Described in the present embodiment is an exemplary case where two-color molding is applied to an exterior component of a mobile phone.

In this figure, a two-color molding equipment 1 includes a fixed mold 2, and a movable mold 3 that is movable forward and rearward with respect to the fixed mold 2. There are provided between the fixed mold 2 and the movable mold 3 a first cavity C1 that is used for shaping a primary molded piece and a second cavity C2 that is used for shaping a secondary molded piece.

The fixed mold 2 is provided with a recess in a rectangular shape at a position corresponding to the first cavity C1, and the first cavity C1 is in communication with a first injection nozzle 4 of a first injection device (not shown) by way of a sprue. The fixed mold 2 is provided with another recess in a rectangular shape at a position corresponding to the second cavity C2, and the second cavity C2 is in communication with a second injection nozzle 5 of a second injection device (not shown) by way of a sprue.

Examples of a primary molding resin to be injected through the first injection nozzle 4 include PC (polycarbonate resin), PMMA (polymethylmethacrylate resin), and PC/PET (a polymer alloy of polycarbonate resin and polyethylene terephthalate resin) as a combination of a plurality of kinds of resins.

Injected through the second injection nozzle 5 as a secondary molding resin may be any one of the resins exemplified above as the primary molding resin in a different color.

It is noted that the secondary molding resin may be in a color same as that of the primary molding resin.

The movable mold 3 can be rotated about a horizontal axis D (in a direction indicated by an arrow E) by a rotating disk 7 of a mold rotating mechanism 6.

Every time the molds are opened, the movable mold 3 is rotated in the direction indicated by the arrow E, and a primary molded piece 8 shaped in the first cavity C1 is shifted to the second cavity C2 so as to be processed by secondary molding in the second cavity C2. There is thus obtained a two-color molded product 10 in which the primary molded piece and the secondary molded piece are integrated together.

The fixed mold 2 and the movable mold 3 forming the first cavity C1 function as primary mold tools, while the fixed mold 2 and the movable mold 3 forming the second cavity C2 function as secondary mold tools.

Figure 2:
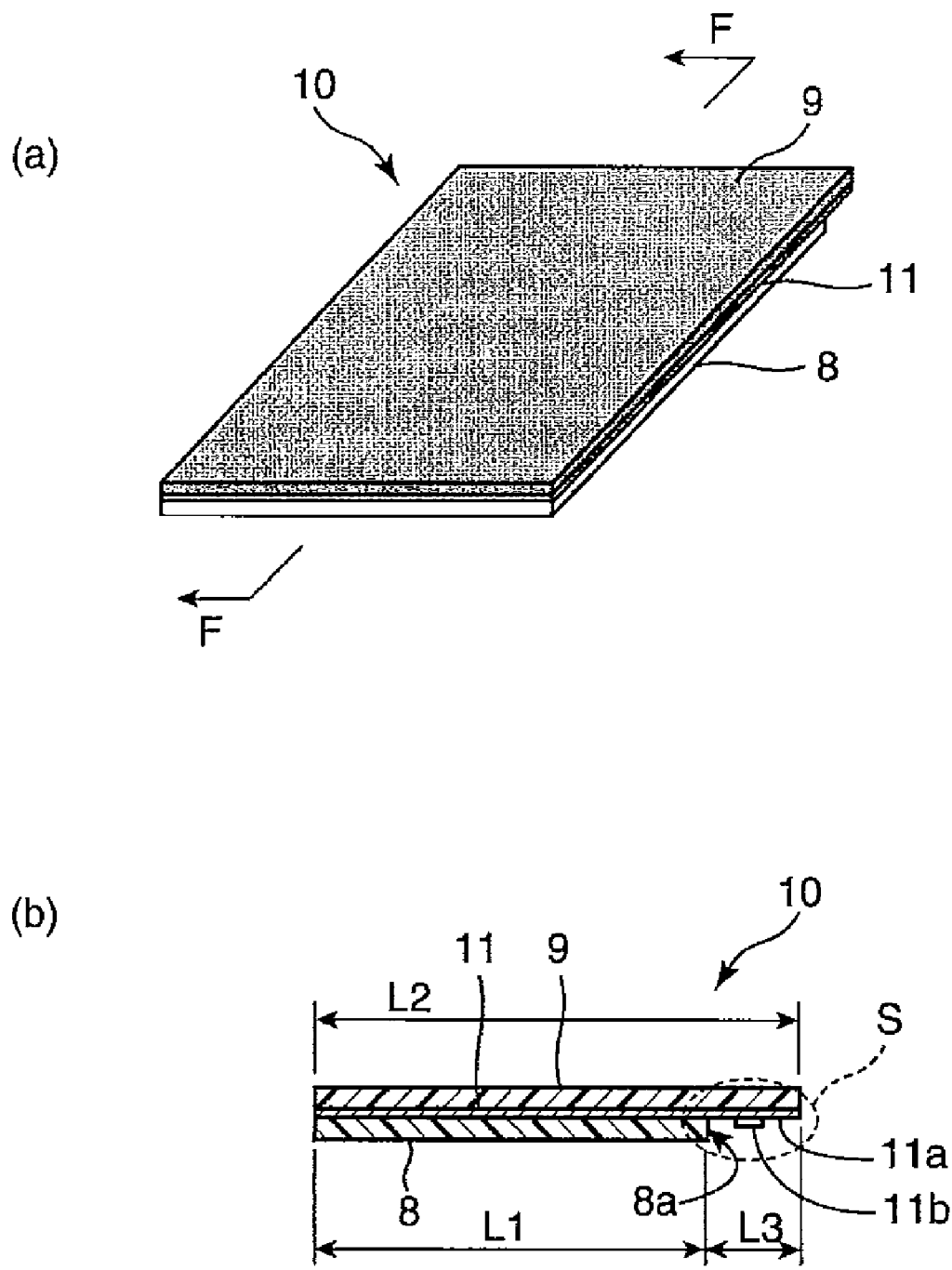
FIG. 2(a) is a perspective view showing a configuration of a two-color molded product according to the present invention.
FIG. 2(b) is a sectional view taken and seen along arrows F-F indicated in FIG. 2(a).

In a case where a functional film (film) 11 provided with an electric circuit or the like is in-molded upon shaping the two-color molded product 10 with use of the two-color molding equipment 1 described above, primary molding is conducted with the functional film 11 being interposed between the fixed mold 2 and the movable mold 3.
2. Two-Color Molded Product FIGS. 2(a) and 2(b) each show a configuration of the two-color molded product 10 that is shaped with the functional film 11 being in-molded therein. FIG. 2(a) is a perspective view, and FIG. 2(b) is a sectional view taken and seen along arrows F-F indicated in FIG. 2(a).

In FIG. 2(a), the two-color molded product 10 includes the primary molded piece 8 that is formed in a rectangular shape by primary molding, a secondary molded piece 9 that is formed in a rectangular shape by secondary molding, and the functional film 11 that is interposed between these two molded pieces.

As shown in FIG. 2(b), the primary molded piece 8 is shaped to be shorter than a longitudinal length L2 of the secondary molded piece 9, so that a part of the functional film 11 protrudes in a shape of a belt from one edge 8a of the primary molded piece 8. Such a film protruding portion 11a has a length L3 and configures an attachment region S that is used for picking up signals from the electric circuit provided on the functional film 11.

The secondary molded piece 9 included in the two-color molded product 10 configures an outer surface of a housing component of the mobile phone. Accordingly, in the two-color molded product 10 configured as described above, the attachment region S is located on the inner side of the secondary molded piece 9. Therefore, signals from the functional film 11 can be picked up not from the outer side but from the inner side of the housing component via an electrode 11b located in the film protruding portion 11a. In other words, the film protruding portion 11a configures a signal pickup portion for picking up signals from the inner side.

3. Primary Mold Tools

Figure 3:
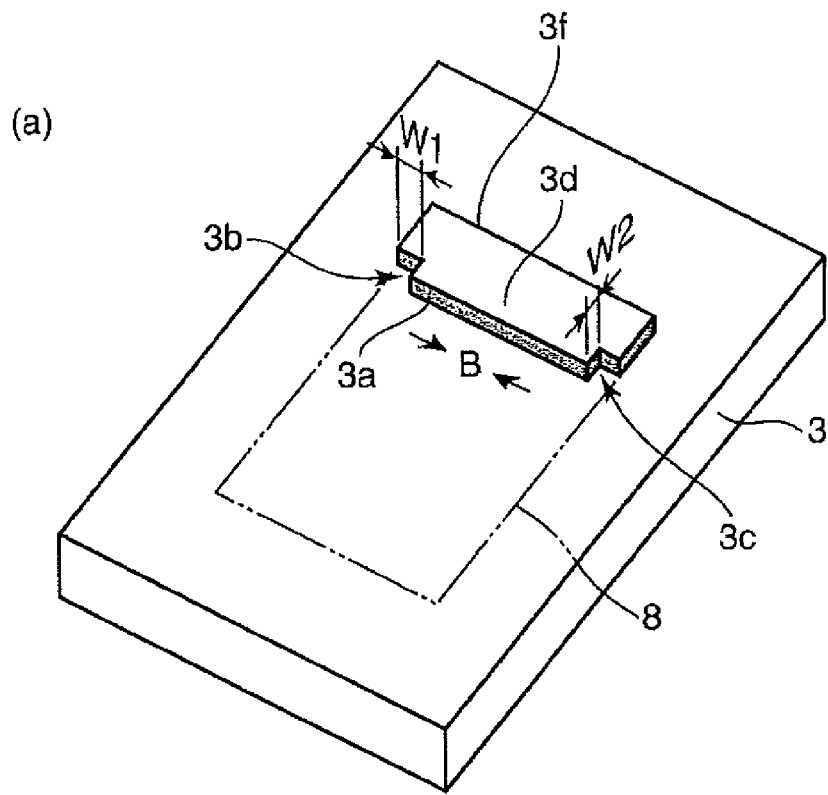
FIGS. 3(a) and 3(b) are perspective views each showing a configuration of a primary mold tool according to the present invention.
Figure 3:
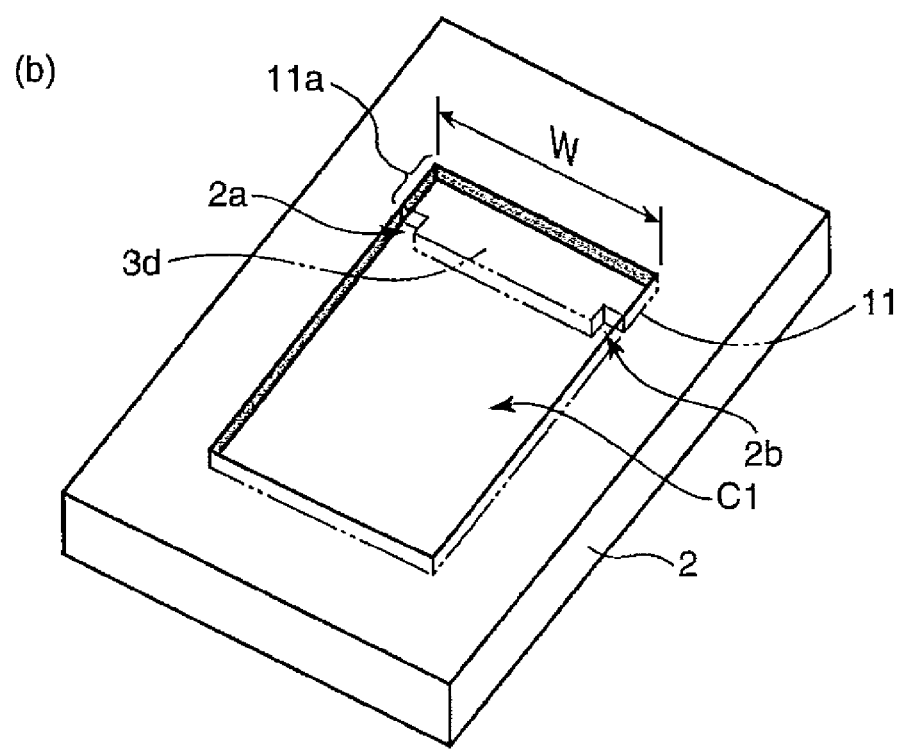

FIGS. 3(a) and 3(b) are perspective views showing configurations of the primary mold tools used for shaping the two-color molded product 10, and FIG. 3(a) shows the configuration of the movable mold 3 while FIG. 3(b) shows the configuration of the fixed mold 2.

In these figures, the fixed mold 2 is provided with the recess used for forming the primary molded piece 8 into a shape of a rectangular thin plate. Upon primary molding, the functional film 11 (see the area indicated by dashed-two dotted lines and denoted by symbol 11) is closely attached to a bottom surface of the recess. The functional film 11 is placed on the bottom surface of the recess in the fixed mold 2 with the electric circuit provided on the surface thereof facing the movable mold 3. In the figure, the area denoted by symbol C1 indicates the first cavity.

Further, the movable mold 3 is provided with a raised portion 3f that can be fitted into the recess at a position corresponding to the film protruding portion 11a.

In the raised portion 3f, there are provided cut off portions 3b and 3c each in a hook shape at both ends in the width direction of a wall surface 3a for cavity formation (hereinafter, referred to as cavity forming wall surface) by which the first cavity C1 is defined. Accordingly, there is provided a convex portion 3d between these cut off portions 3b and 3c.

When the fixed mold 2 and the movable mold 3 are closed together, the first cavity C1 is formed therebetween, and provided at both sides of the convex portion 3d are concave portions 2a and 2b that allow the primary molding resin to flow thereinto.

The cut off portions 3b and 3c each have a width W1 which is preferably sized in the range of 2% to 10% of a width W of the first cavity C1. Further, the cut off portions 3b and 3c each have a length W2 in the depth direction which is preferably sized in the range of 1% to 10% of the width W.

Figure 4:
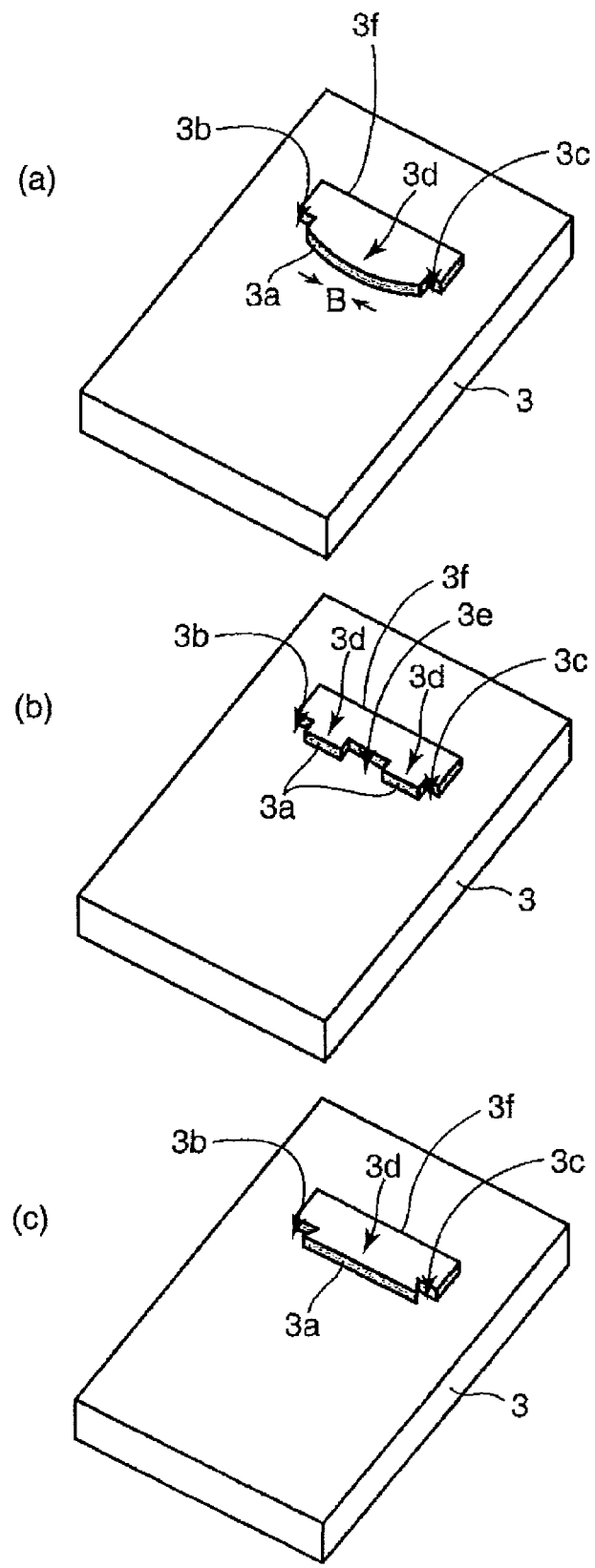
FIGS. 4(a) to 4(c) are explanatory views each showing a modification of a convex portion shown in FIGS. 3(a) and 3(b).
Figure 5:
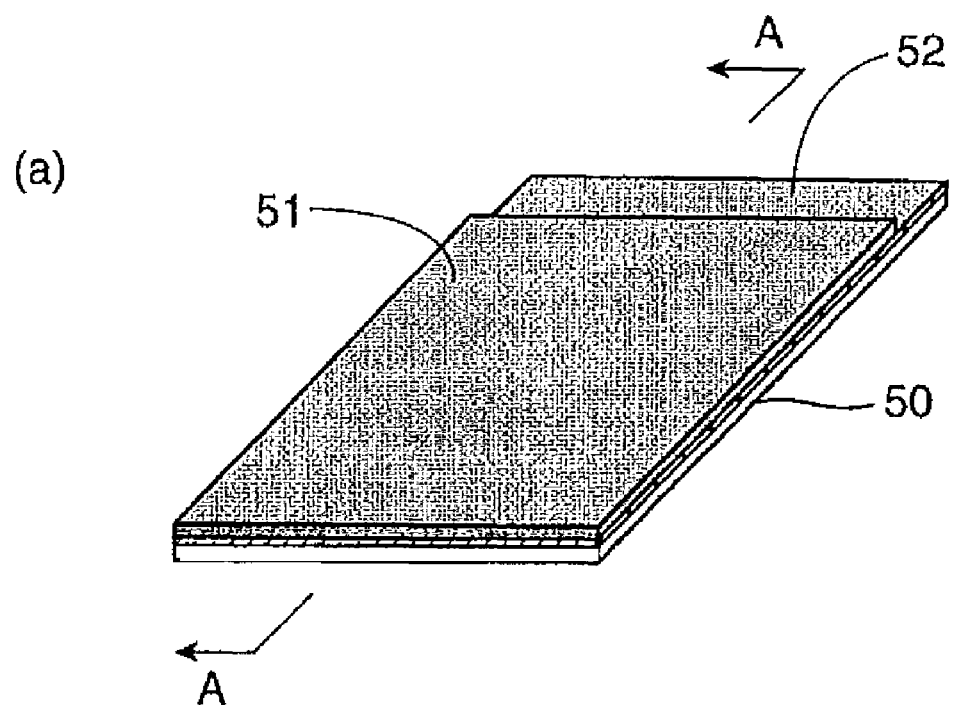
FIG. 5(a) is a perspective view showing a configuration of a conventional two-color molded product.
FIG. 5(b) is a sectional view taken and seen along arrows A-A indicated in FIG. 5(a).
Figure 5:
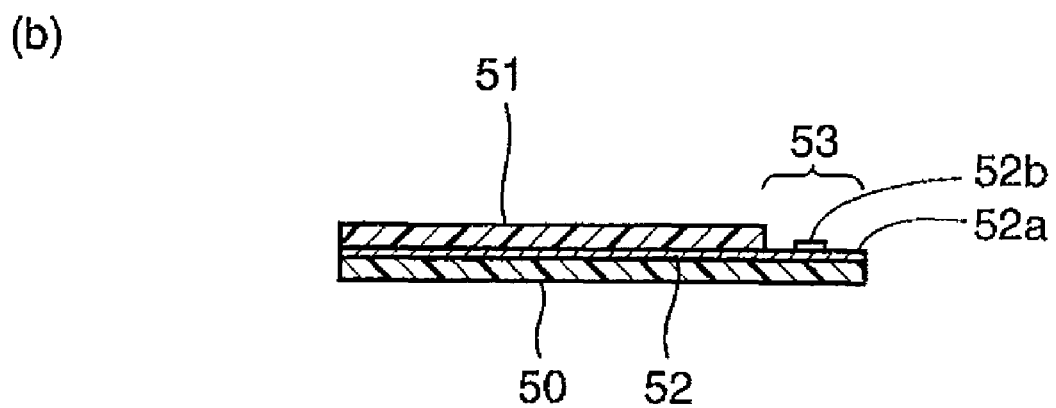
Figure 6:
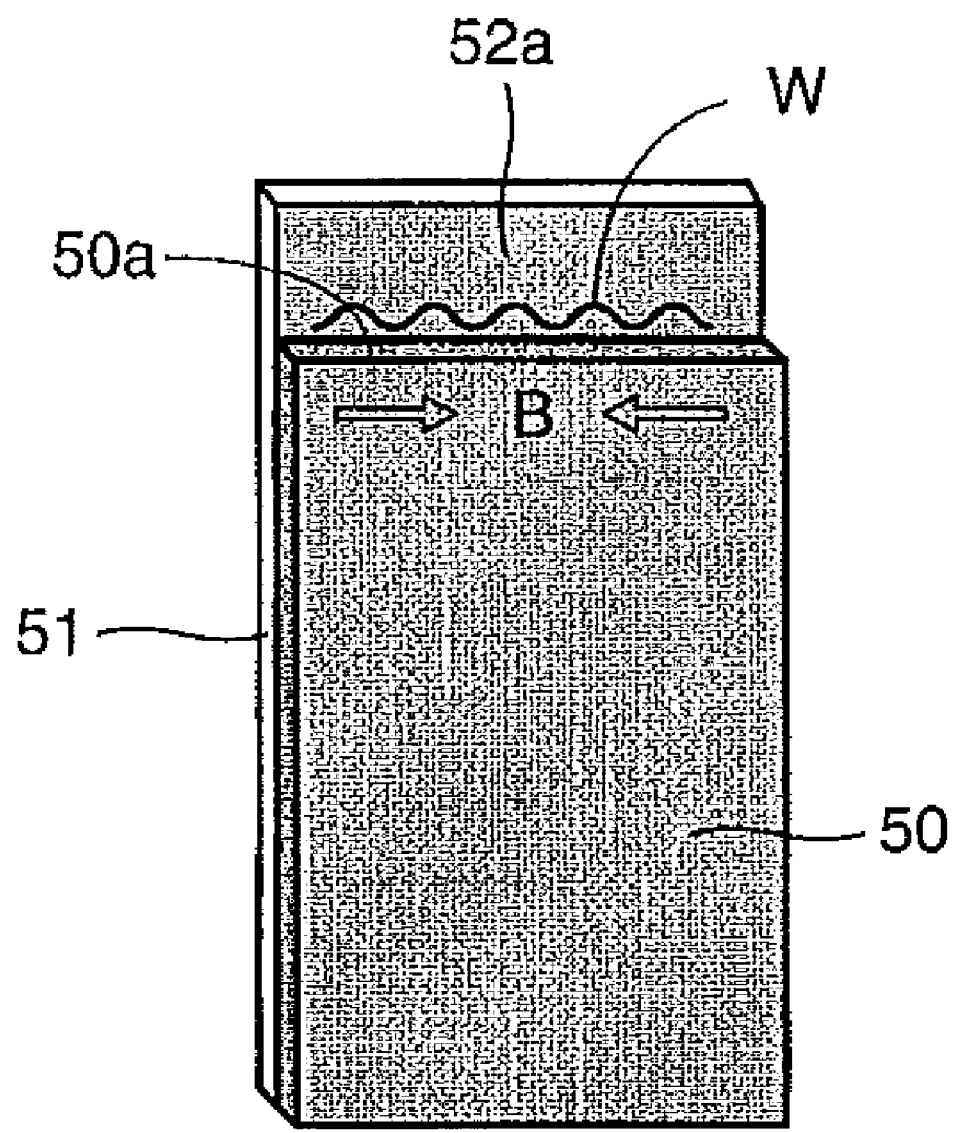
FIG. 6 is a perspective view illustrating ruffling generated in a conventional two-color molded product that includes a film being in-molded therein.

FIGS. 4(a) to 4(c) show modifications of the raised portion 3f, respectively.

In the raised portion 3f shown in FIG. 4(a), the cavity forming wall surface 3a is formed in a circular arc shape.

In the raised portion 3f shown in FIG. 4(b), the cavity forming wall surface 3a is provided substantially at a center thereof with another cut off portion 3e, so that the entire raised portion 3f is formed in a pectinate shape.

In the raised portion 3f shown in FIG. 4(c), the convex portion 3d is formed into an inverted wedge shape, more specifically, the cavity forming wall surface 3a of the convex portion 3d is made wider than a base portion of the convex portion 3d.

As described above, the raised portion 3f can be formed in an arbitrary shape under a condition that the cavity forming wall surface 3a is provided at the respective ends thereof with the cut off portions 3b and 3c so as to interrupt the primary molding resin injected around the film protruding portion 11a and thus restrict mold shrinkage (in directions indicated by arrows B) thereof.

4. Two-Color Molding Method

Described next are operations of the two-color molding equipment according to the present invention with reference to FIGS. 1, 2(a), 2(b), 3(a), and 3(b).

The description starts from the state where the fixed mold 2 and the movable mold 3 are opened.

In FIG. 1, the functional film 11 is placed in the first cavity C1, the molds are closed, and the primary molding resin is injected through the first injection nozzle 4 into the first cavity C1.

After the primary molding resin is injected, mold shrinkage starts in the primary molded piece 8. However, in the present embodiment, as shown in FIGS. 3(a) and 3(b), the movable mold 3 is provided with the raised portion 3f so as to correspond to the film protruding portion 11a, and the raised portion 3f is provided on the cavity forming wall surface 3a with the convex portion 3d. Accordingly, mold shrinkage in the directions indicated by the arrows B is restricted in the parts of the primary molded piece filled and shaped respectively in the concave portions 2a and 2b. Therefore, the primary molded piece 8 filled and shaped in the first cavity C1 has a longitudinal width equal to the longitudinal width W of the first cavity C1.

After the primary molded piece 8 is shaped, the fixed mold 2 and the movable mold 3 are opened.

The primary molded piece 8 having the film 11 attached thereto is then caused to face the second cavity C2 when the movable mold 3 is rotated in a direction indicated by an arrow E.

The fixed mold 2 and the movable mold 3 are closed again in this state, and the secondary molding resin is injected through the second injection nozzle 5 into the second cavity C2.

As described above, the film protruding portion 11a of the functional film 11 to be joined to the primary molded piece 8 is not affected by the mold shrinkage in the primary molded piece during primary molding. As a result, secondary molding can be conducted without any influence of ruffling to shape the two-color molded product 10.

The preferred embodiment of the present invention has been sufficiently described with reference to the accompanying drawings. However, the present invention will be possibly embodied with modifications and alterations in various ways by a person skilled in this technical field. Such modifications and alterations should be understood as being included in the technical scope of the present invention unless departing from the scope of ideas for solving the problems in the present invention.

INDUSTRIAL APPLICABILITY

The two-color molding equipment according to the present invention is applicable as a measure for incorporating and combining a metal component such as wiring into an exterior component, which is obtained by resin molding, of a mobile phone, a PDA (personal digital assistant), a portable game machine, or the like.

| DESCRIPTION OF SYMBOLS | |
|---|---|
| 1 | two-color molding equipment |
| 2 | fixed mold |
| 2a, 2b | concave portions |
| 3 | movable mold |
| 3a | wall surface for cavity formation |
| 3b, 3c | cut off portions |
| 3d | convex portion |
| 3e | another cut off portion |
| 3f | raised portion |
| 4 | first injection nozzle |
| 5 | second injection nozzle |
| 6 | mold rotating mechanism |
| 7 | rotating disk |
| 8 | primary molded piece |
| 9 | secondary molded piece |
| 10 | two-color molded product |
| 11 | functional film (film) |
| 11a | film protruding portion |
| 11b | electrode |
| C1 | first cavity |

-continued

| DESCRIPTION OF SYMBOLS | |
|---|---|
| C2 | second cavity |
| W | ruffling |

The invention claimed is:

1. A two-color molded product comprising:

a primary molded piece shaped by primary molding;

a secondary molded piece overlaid on the primary molded piece and shaped by secondary molding; and a functional film interposed between the molded pieces and provided on a surface thereof with an electric circuit, wherein the secondary molded piece is formed to be substantially equal in size with the film, the primary molded piece is formed to be smaller than the secondary molded piece so as to allow a part of the functional film to protrude therefrom, and a protruding portion of the functional film has an exposed surface that configures a signal pickup portion for picking up a signal from the functional film.

2. The two-color molded product according to claim 1, wherein the secondary molded piece configures an outer surface of a housing component.

* * * * *